| (12) | United States Patent | (10) Patent No.: | US 9,858,850 B2 |
|---|---|---|---|
| | Lin | (45) Date of Patent: | Jan. 2, 2018 |

(54) IMAGE ADJUSTING METHOD AND RELATED DISPLAY

(71) Applicant: BENQ CORPORATION, Taipei (TW)

(72) Inventor: Hsin-Nan Lin, Taipei (TW)

(73) Assignee: BenQ Corporation, Taipei (TW)

( * ) Notice: Subject to any disclaimer, the term of this patent is extended or adjusted under 35 U.S.C. 154(b) by 55 days.

(21) Appl. No.: 14/799,584

(22) Filed: Jul. 15, 2015

(65) Prior Publication Data

US 2016/0042680 A1   Feb. 11, 2016

(30) Foreign Application Priority Data

Aug. 8, 2014  (TW) .............................. 103127376 A

(51) Int. Cl.
| G09G 3/20 | (2006.01) |
|---|---|
| H04N 5/20 | (2006.01) |
| H04N 5/57 | (2006.01) |
| H04N 21/431 | (2011.01) |

(52) U.S. Cl.
CPC ............. *G09G 3/2007* (2013.01); *H04N 5/20* (2013.01); *H04N 5/57* (2013.01); *G09G 2320/0271* (2013.01); *G09G 2320/0626* (2013.01); *G09G 2320/0646* (2013.01); *G09G 2320/0673* (2013.01); *H04N 21/4318* (2013.01)

(58) Field of Classification Search
CPC ......... G09G 3/2007; G09G 2320/0271; G09G 2320/0626; G09G 2320/0673; G09G 2320/0646; H04N 5/20; H04N 5/57; H04N 21/4318
See application file for complete search history.

(56) References Cited

U.S. PATENT DOCUMENTS

| 9,601,062 | B2 * | 3/2017 | An ........................ G09G 3/3426 |
|---|---|---|---|
| 2004/0151373 | A1 * | 8/2004 | Wang ........................ G06T 9/00 382/172 |
| 2005/0195298 | A1 * | 9/2005 | Byun ...................... G06T 5/008 348/254 |
| 2007/0030998 | A1 * | 2/2007 | O'Hara ................. G06T 7/2053 382/100 |
| 2008/0272999 | A1 * | 11/2008 | Kurokawa ........... G09G 3/3406 345/89 |

(Continued)

FOREIGN PATENT DOCUMENTS

| CN | 1925582 B | 9/2010 |
|---|---|---|
| CN | 103617792 B | 9/2015 |

(Continued)

*Primary Examiner* — Amare Mengistu
*Assistant Examiner* — Jennifer Zubajlo

(57) ABSTRACT

An image adjusting method and a related display are applied to automatically adjust luminance of an image according to analyze of a gray level histogram of the image. The image adjusting method includes generating the gray level histogram of the image, dividing the gray level histogram into at least one first zone and one second zone, comparing a total amount of pixels in the first zone with a threshold, and utilizing a modification function to adjust luminance of each pixel within the first zone according to a comparison result. A grey level of the first zone is greater than a grey level of the second zone. Luminance of the first zone is decreased by the modification function while the total amount of pixels in the first zone is greater than the threshold.

15 Claims, 5 Drawing Sheets

(56) References Cited

U.S. PATENT DOCUMENTS

| | | | |
|---|---|---|---|
| 2009/0002285 A1* | 1/2009 | Baba | G09G 3/3406 345/77 |
| 2009/0167670 A1* | 7/2009 | Peng | G09G 3/3426 345/102 |
| 2011/0123133 A1* | 5/2011 | Mohanty | G06T 5/009 382/274 |
| 2013/0002733 A1* | 1/2013 | Origuchi | G09G 3/003 345/690 |
| 2013/0257922 A1* | 10/2013 | Park | G09G 3/3426 345/690 |
| 2017/0200430 A1* | 7/2017 | Lin | G09G 5/10 |

FOREIGN PATENT DOCUMENTS

| | | |
|---|---|---|
| EP | 2 290 945 A1 | 3/2011 |
| GB | 2 408 138 A | 5/2005 |
| GB | 2 418 316 A | 3/2006 |

\* cited by examiner

IMAGE ADJUSTING METHOD AND RELATED DISPLAY

CROSS-REFERENCE TO RELATED APPLICATIONS

This application claims the benefit of priority of Taiwan Patent Application 10327376, filed Aug. 8, 2014 and included herein by reference in its entirety.

BACKGROUND OF THE INVENTION

1. Field of the Invention

The present invention relates to an image adjusting method and the related display, and more particularly, to an image adjusting method and the related display capable of detecting gray level distribution to adjust luminance of the image.

2. Description of the Prior Art

With the advanced technology, a huge computer host is changed to be a personal desktop computer suitable for household life. The personal desktop computer can execute application programs such as the web browser, the document software and/or the game software. While the game software is executed upon the personal desktop computer, an image showed on the display may generate sudden luminance variation of partial zone within the image due to content of the game, eyesight of the consumer is difficult to suit rapid illumination variation of the image, for example, the image showed on the conventional display can be suddenly switched from a brilliant background to a dark background, and the consumer cannot clearly distinguish patterns inside the dark scene. Please refer to FIG. 1. FIG. 1 is a diagram of a gamma curve of the conventional display which has luminance adjusting function in the prior art. The curve B is the gamma curve indicative of the image without luminance adjustment, the curve A is the gamma curve indicative of the image that is adjusted due to dark scene, and the curve C is the gamma curve indicative of the image that is adjusted due to brilliant scene. As shown in FIG. 1, the conventional luminance adjusting method adjusts whole pixels of the image, which represents a partial zone of the image not in need of amendment is adjusted accordingly, and the image adjusted by the conventional luminance adjusting method has low quality.

SUMMARY OF THE INVENTION

The present invention provides an image adjusting method and the related display capable of detecting gray level distribution to adjust luminance of the image for solving above drawbacks.

According to the claimed invention, an image adjusting method includes generating a gray level histogram of an image, dividing the gray level histogram into at least one first zone and at least one second zone, comparing a total amount of pixels in the first zone with a threshold, and utilizing a modification function to adjust luminance of each pixel within the first zone according to a comparison result. A gray level of the first zone is greater than a gray level of the second zone. Luminance of pixels within the first zone is decreased by the modification function while the total amount of pixels in the first zone is greater than the threshold.

According to the claimed invention, a display includes a panel unit and a controller. The panel unit is adapted to display an image. The controller is electrically connected to the panel unit. The controller is adapted to generate a gray level histogram of the image, and to divide the gray level histogram into at least one first zone and at least one second zone. The controller is further adapted to compare a total amount of pixels in the first zone with a threshold, and to adjust luminance of each pixel within the first zone by a modification function according to a comparison result. A grey level of the first zone is greater than a grey level of the second zone, and the controller decreases luminance of pixels within the first zone through the modification function while the total amount of pixels in the first zone is greater than the threshold.

The image adjusting method and the related display of the present invention can determine whether scene of the image is varied according to luminance of whole zone or partial zones of the image, analyze the gray level histogram of the image to recognize the high-brightness pattern within the dark background when the scene is switched in the dark, and decrease luminance of the pixels related to the high-brightness pattern by the predetermined modification function, so as to transform the high-brightness pattern within the dark background into comfortable looking (not harsh to the eye) and to maintain an original status of the dark background. Comparing to the prior art, the present invention preserves shade contrast between different patterns inside the image and definition of the image, to effectively increase image quality of the display for preferred market competition.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
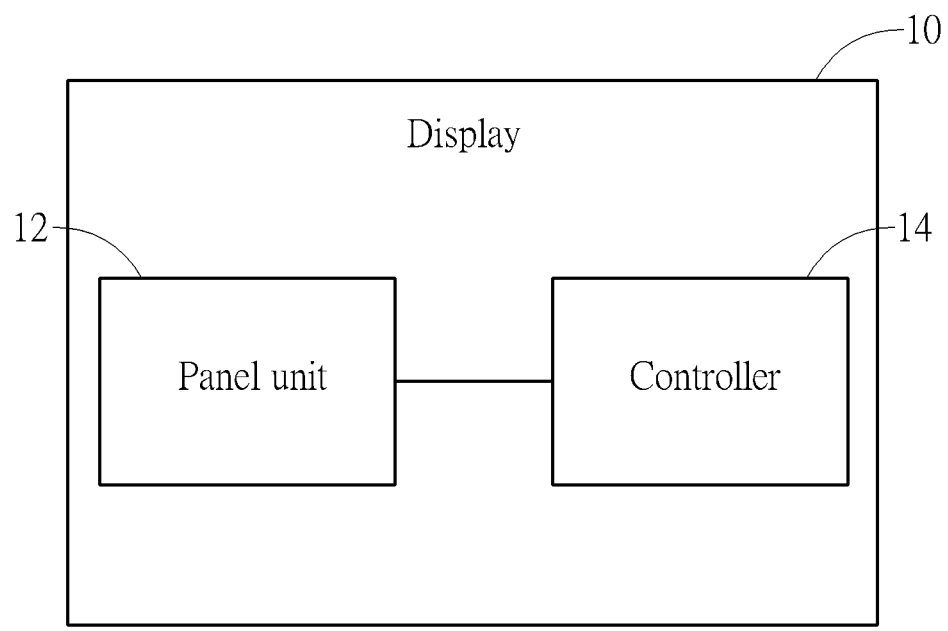
FIG. 2 is a functional block diagram of a display according to an embodiment of the present invention.

Please refer to FIG. 2. FIG. 2 is a functional block diagram of a display 10 according to an embodiment of the present invention. The display 10 includes a panel unit 12 and a controller 14 electrically connected to each other. The controller 14 drives the panel unit 12 to display an image according to information received from the host. While the image showed on the display 10 is varied from a brilliant background to a dark background, the user may be difficult to clearly observe a high-brightness pattern or other patterns within the dark background of the image due to sudden luminance variation of eyesight. The controller 14 can analyze a gray level histogram of the image to distinguish the high-brightness pattern inside the image, determine whether luminance of the high-brightness pattern is decreased or not according to parameters such as a total amount of pixels, and the image showed on the display 10 can be adjusted clearly and distinctly.

For example, when the display 10 displays an image with game frame and background of the said image switches from brilliant outdoors to dark indoors, recognition degree of the indoor image may be damaged by luminance difference between the dark background indicative of indoors and the high-brightness pattern indicative of a light source. Therefore, the display 10 of the present invention can automatically recognize the high-brightness pattern within the dark indoors, and adjust intensity (such like decreasing luminance) of the high-brightness pattern according to its initial value, so as to obviously enhance shade contrast of the image having the high-brightness pattern and to maintain preferred recognition of the said image.

Figure 1:
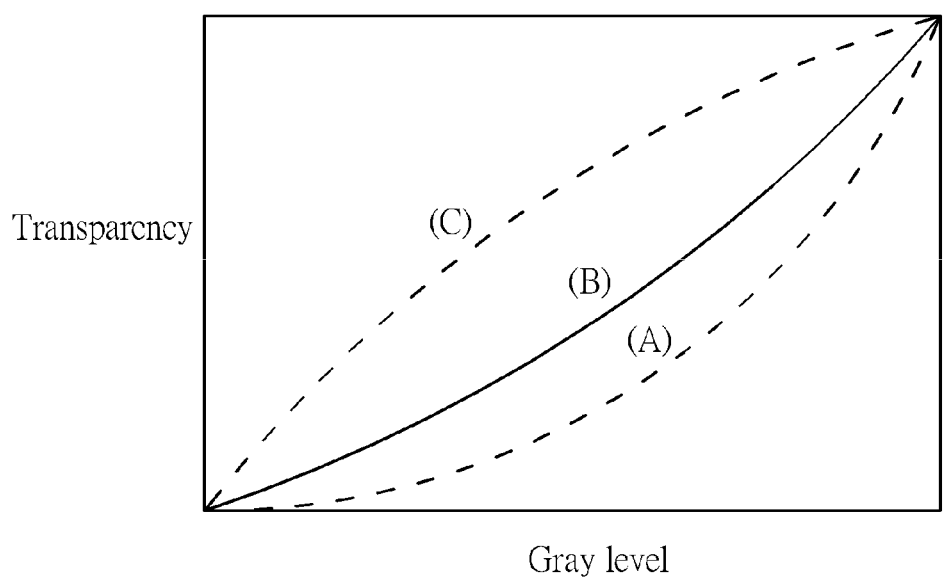
FIG. 1 is a diagram of a gamma curve of the conventional display which has luminance adjusting function in the prior art.
Figure 3:
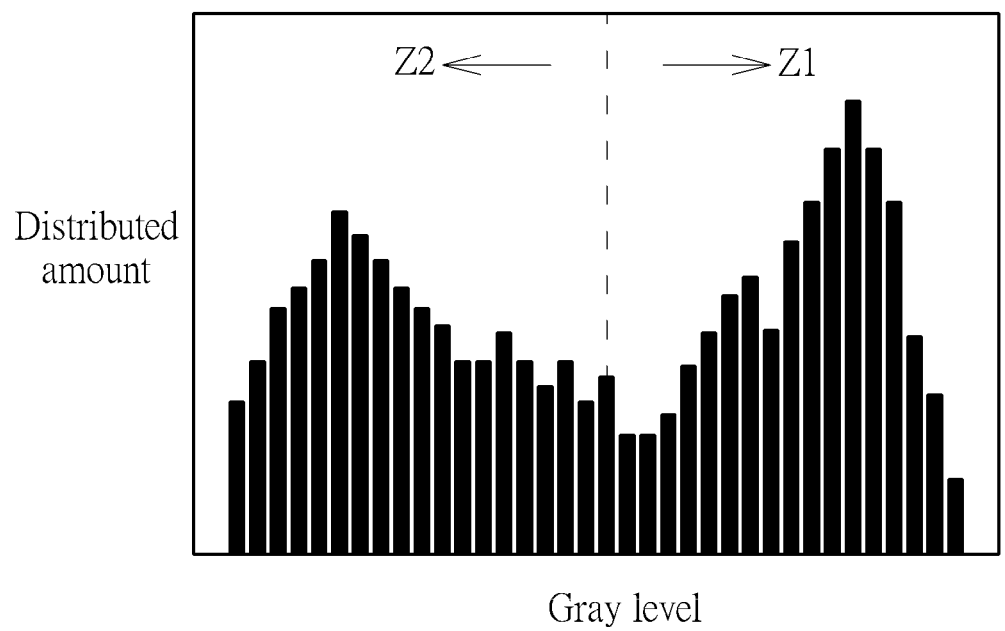
FIG. 3 is a gray level histogram of the image showed on the display according to the embodiment of the present invention.
Figure 4:
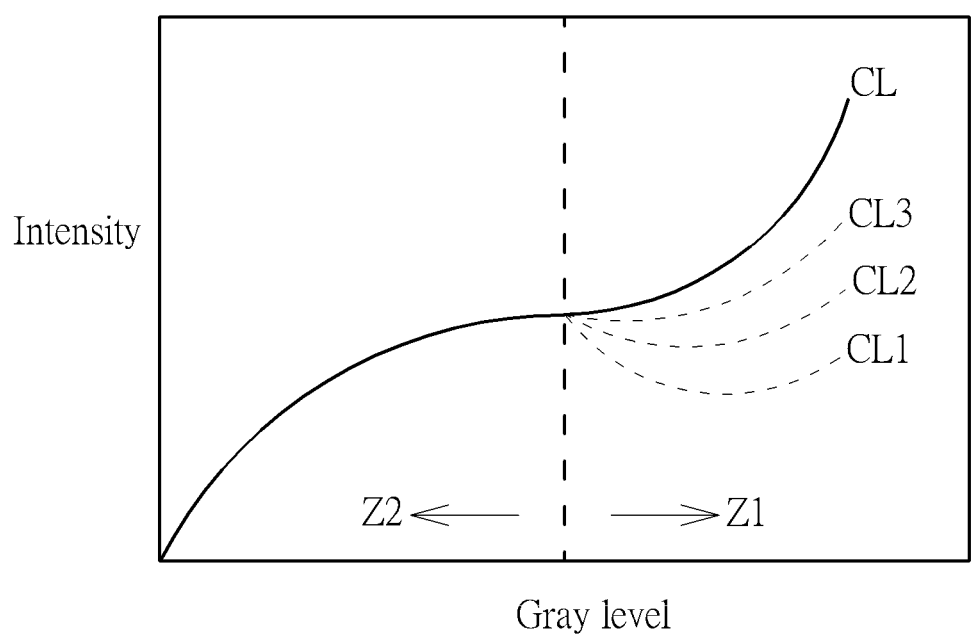
FIG. 4 is a diagram of curves with different luminance according to the embodiment of the present invention.
Figure 5:
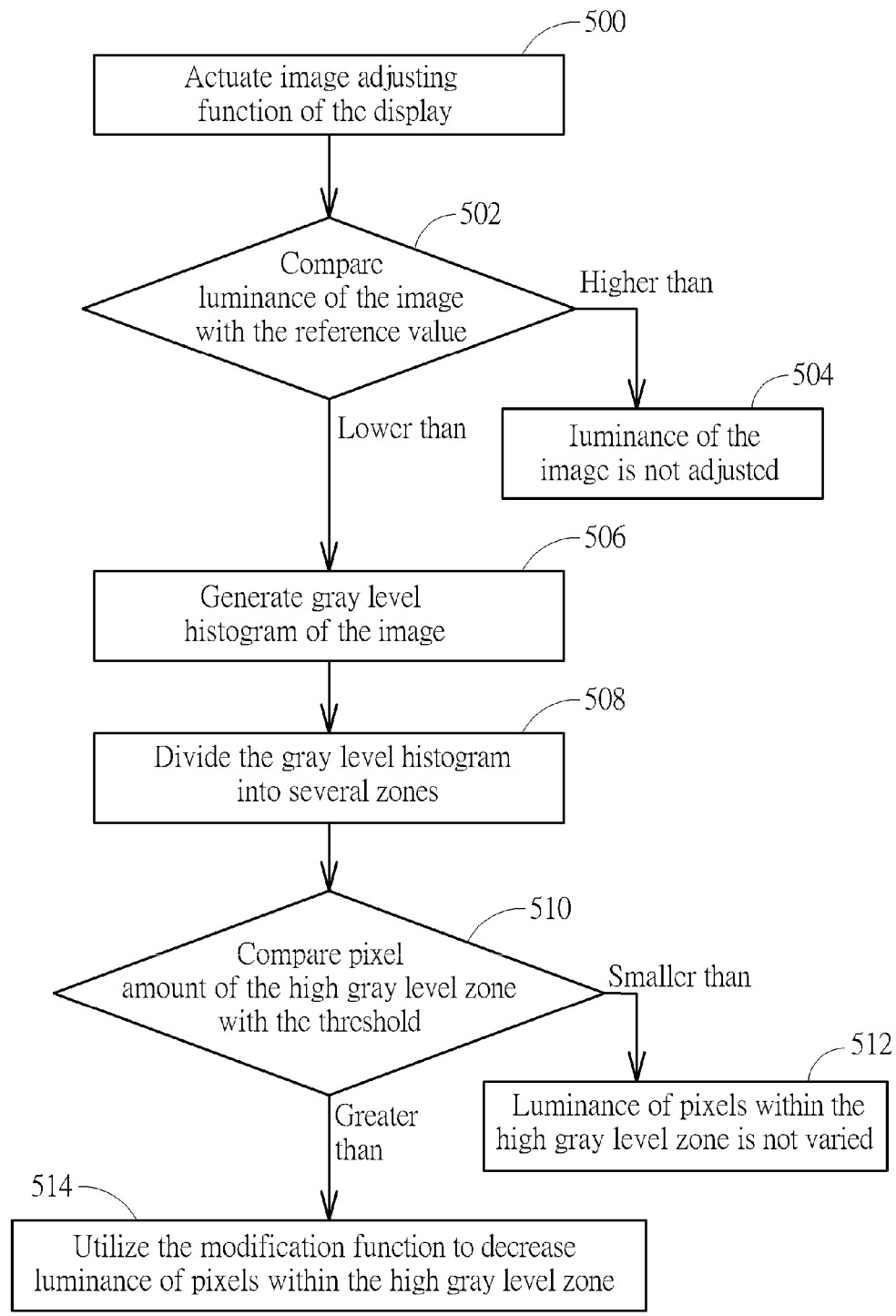
FIG. 5 is a flow chart of an image adjusting method according to the embodiment of the present invention.

Please refer to FIG. 3 to FIG. 5. FIG. 3 is a gray level histogram of the image showed on the display 10 according to the embodiment of the present invention, wherein the horizontal axis in FIG. 3 represents gray levels of the image and the vertical axis in FIG. 3 represents a distributed amount of each gray level of the image. FIG. 4 is a diagram of curves with different luminance according to the embodiment of the present invention, wherein the horizontal axis in FIG. 4 represents gray levels of the image and the vertical axis in FIG. 4 represents an intensity of each gray level of the image. FIG. 5 is a flow chart of an image adjusting method according to the embodiment of the present invention. The image adjusting method described in FIG. 5 is suitable for the display 10 shown in FIG. 1.

The controller 14 may include an analyzing unit or an adjusting unit (which is not shown in figures) adapted to execute image analysis, gray level analysis and pixel adjustment. A memory (not shown in figures) of the controller 14 can be utilized to decide a reference value applicable to determination of the image luminance and a threshold applicable to determination of a total amount of pixels, and further to pre-store a modification function. First, steps 500 and 502 are executed to actuate the image adjusting function of the display 10, and the controller 14 compares luminance of the image with the reference value to determine whether the image has the brilliant background or the dark background. When the image luminance is greater than the reference value, the image has the brilliant background and luminance of pixels within the image is not adjusted such as step 504. When the image luminance is lower than the reference value, the image has the dark background, so the image adjusting method starts to determine whether the modification function is utilized to adjust the pixels within the image. Then, step 506 is executed that the controller 14 can generate the gray level histogram according to the image shown on the panel unit 12, as shown in FIG. 3, and the gray level histogram shows distribution and related amounts of different gray levels. Then, steps 508 and 510 are executed to divide the gray level histogram into a first zone Z1 and a second zone Z2 at least, and to compare the total amount of pixels in the first zone Z1 with the threshold. The first zone Z1 is defined to be a range with larger gray level, and the second zone Z2 is defined to be a range with smaller gray level. The present invention further can divide the gray level histogram into a plurality of zones (which numeral is more than two), and one of the plurality of zones with largest gray level can be defined as the first zone Z1 for recognition of the high-brightness pattern within the indoor image.

The gray level histogram of the image can be divided into two or more than two zones, one of the zones with lower pixel value represents the dark background within the image, step 502 of comparing the image luminance with the reference value of the image adjusting method in the present invention can determine whether luminance of the image is lower than the reference value according to pixel distribution of the first zone Z1 and the second zone Z2, or according to a total amount of pixels in the second zone Z2. As the luminance of the image is lower than the reference value, the image is switched from the brilliant outdoor background to the dark indoor background, and the image adjusting method of the present invention is actuated to obtain optimum luminance adjustment while background of the game frame is varied. In addition, the present invention not only can adjust the image whose background switched between the brilliant outdoors and the dark indoors, but also can adjust pixel luminance of patterns always within the dark image.

When the total amount of pixels in the first zone Z1 is lower than the threshold, dimensions of the high-brightness pattern is small and definition of the image is not obviously affected, and step 512 is executed to not vary luminance of the pixels (such as Luma index) within the first zone Z1 by the controller 14. When the total amount of pixels in the first zone Z1 is greater than the threshold, the high-brightness pattern occupies a great deal of superficial measure within the image, and step 514 is executed that the controller 14 utilizes the modification function to decrease the luminance of the pixels (such as Luma index) within the first zone Z1, to ease off contrast different between the high-brightness pattern and the dark background. Moreover, the present invention can execute step 514 while the total amount of pixels in the first zone Z1 is lower than and greater than the threshold, which means execution of step 514 is not affected by the total amount of pixels. It should be mentioned that characteristics of the modification function is varied through the gray level distribution of the image, for instance, correction quantity of the modification function is larger while a specific zone has higher pixel luminance, the correction quantity of the modification function is smaller while the specific zone has lower pixel luminance. As shown in FIG. 5, the curve CL is an initial pixel luminance before correction. When the first zone Z1 has higher pixel luminance (such as Luma index being between 8~15), the curve CL is modified as the curve CL1 by the modification function; when the first zone Z1 has middle pixel luminance (such as Luma index being between 5~7, the curve CL is modified as the curve CL2 by the modification function; when the first zone Z1 has lower pixel luminance (such as Luma index being between 0~4, the curve CL is modified as the curve CL3 by the modification function.

The modification function can be a numeral sequence which corresponds to amounts of the gray level within the first zone Z1, and the image adjusting method subtracts predetermined values of the modification function from all pixels within the first zone Z1 to modify pixel intensity of the curve CL within the first zone Z1. Furthermore, the modification function can decrease luminance of whole pixels within the first zone Z1 by a predetermined ratio, or each pixel within first zone Z1 can be reduced by its own ratio to respectively decrease luminance of the whole pixels. Correction quantity of the curve CL is designed according to initial luminance. The correction quantity is larger while the initial luminance is higher, and the correction quantity is smaller while the initial luminance is lower, as shown in FIG. 4. Calculation of the modification function is not limited to the above-mentioned embodiments, which depends on design demand, and a detailed description is omitted herein for simplicity.

The image adjusting method and the related display of the present invention can determine whether scene of the image is varied according to luminance of whole zone or partial zones of the image, analyze the gray level histogram of the image to recognize the high-brightness pattern within the dark background when the scene is switched in the dark, and decrease luminance of the pixels related to the high-brightness pattern by the predetermined modification function, so as to transform the high-brightness pattern within the dark background into comfortable looking (not harsh to the eye) and to maintain an original status of the dark background. Comparing to the prior art, the present invention preserves shade contrast between different patterns inside the image and definition of the image, to effectively increase image quality of the display for preferred market competition.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image adjusting method comprising:
   generating a gray level histogram of an image;
   dividing the gray level histogram into at least one first zone and at least one second zone, wherein a gray level of the first zone is greater than a gray level of the second zone;
   comparing a total amount of pixels in the first zone with a threshold; and
   utilizing a modification function to decrease luminance of each pixel within the first zone when the total amount of pixels in the first zone is greater than the threshold to reduce contrast between the first zone and the second zone.

2. The image adjusting method of claim 1, wherein the luminance of the pixels within the first zone is not varied by the modification function when the total amount of pixels in the first zone is smaller than the threshold.

3. The image adjusting method of claim 1, wherein the modification function is varied according to gray level distribution of the image such that a correction quantity of the modification function is larger when a specific zone has pixel luminance higher than a predetermined Luma index and the correction quantity of the modification function is smaller when the specific zone has pixel luminance lower than the predetermined Luma index.

4. The image adjusting method of claim 1, further comprising:
   determining whether luminance of the image is lower than a reference value.

5. The image adjusting method of claim 4, wherein while the luminance of the image is lower than the reference value, the image adjusting method determines whether the modification function is utilized to adjust the luminance of the pixels within the first zone.

6. The image adjusting method of claim 4, wherein a step of determining whether the luminance of the image is lower than the reference value comprises:
   determining the pixel distribution of the first zone and the second zone.

7. The image adjusting method of claim 4, wherein a step of determining whether the luminance of the image is lower than the reference value comprises:
   determining the total amount of pixels in the second zone.

8. A display comprising:
   a panel unit adapted to display an image; and
   a controller electrically connected to the panel unit, the controller being adapted to generate a gray level histogram of the image, and to divide the gray level histogram into at least one first zone and at least one second zone, the controller being further adapted to compare a total amount of pixels in the first zone with a threshold, and to decrease luminance of pixels within the first zone through a modification function when the total amount of pixels in the first zone is greater than the threshold to reduce contrast between the first zone and the second zone;
   wherein a grey level of the first zone is greater than a grey level of the second zone.

9. The display of claim 8, wherein the controller does not vary the luminance of the pixels within the first zone while the total amount of pixels in the first zone is smaller than the threshold.

10. The display of claim 8, wherein the modification function is varied according to gray level distribution of the image such that a correction quantity of the modification function is larger when a specific zone has pixel luminance higher than a predetermined Luma index and the correction quantity of the modification function is smaller when the specific zone has pixel luminance lower than the predetermined Luma index.

11. The display of claim 8, wherein the controller determines whether luminance of the image is lower than a reference value, to determine whether the modification function is utilized to adjust the luminance of the pixels within the first zone.

12. The display of claim 11, wherein the controller determines pixel distribution of the first zone (Z1) and the second.

13. An image adjusting method comprising:
   comparing luminance of an image with a reference value;
   not adjusting the luminance of the image when the luminance of the image is greater than the reference value; and
   when the luminance of the image is not greater than the reference value performing the following steps;
     generating a gray level histogram of the image;
     dividing the gray level histogram into at least one first zone and at least one second zone, wherein a gray level of the first zone is greater than a gray level of the second zone;
     comparing a total amount of pixels in the first zone with a threshold; and
     utilizing a modification function to decrease luminance of each pixel within the first zone when the total amount of pixels in the first zone is greater than the threshold to reduce contrast between the first zone and the second zone.

14. The image adjusting method of claim 13, further comprising:
   comparing the total amount of pixels in the first zone with a threshold; and
   utilizing a modification function to adjust the luminance of the pixels within the first zone while the total amount of pixels in the first zone is greater than the threshold and the luminance of the image is lower than the reference value.

15. The image adjusting method of claim 13, further comprises:
   determining whether the luminance of the image is lower than the reference value according to pixel distribution of the first zone and the second zone.

* * * * *